United States Patent
Dresden

[15] 3,659,895
[45] May 2, 1972

[54] SWIVEL SEAT LOCKING MECHANISM
[72] Inventor: Du Wayne D. Dresden, Birmingham, Mich.
[73] Assignee: General Motors Corporation, Detroit, Mich.
[22] Filed: Aug. 10, 1970
[21] Appl. No.: 62,296

[52] U.S. Cl. ............................296/65 R, 74/527, 248/416, 248/425, 248/430, 297/349
[51] Int. Cl. ..................................................B60a 1/08
[58] Field of Search ............... 296/65 R, 65 A, 67; 297/240, 297/344, 346, 349; 248/416, 418, 424, 425, 429, 430; 74/527

[56] References Cited

UNITED STATES PATENTS

| | | | |
|---|---|---|---|
| 3,445,143 | 5/1969 | Swenson | 248/425 X |
| 3,572,817 | 3/1971 | Colautti | 296/65 R |
| 3,129,017 | 4/1964 | Graham | 296/65 R X |
| 3,542,326 | 11/1970 | Reapsummer | 248/413 |
| 2,953,188 | 9/1960 | Garvey et al. | 248/416 X |
| 3,476,435 | 11/1969 | Hitzelberger | 296/65 R |

Primary Examiner—Benjamin Hersh
Assistant Examiner—Leslie J. Papernor
Attorney—W. E. Finken and Herbert Furman

[57] ABSTRACT

A vehicle seat is mounted on a vehicle floor pan for both rotational movement about a vertical axis and longitudinal movement with respect to the vehicle. A pair of floor pan mounted longitudinally extending rails slidably mount a carrier on the floor pan for longitudinal movement with the seat. A locking mechanism includes a locking member pivoted to the carrier and spring biased to a locked position in which first and second arcuate arm portions of the locking member respectively engage one of the rails and the seat to hold the seat against both the rotational and the longitudinal movement. An actuating handle is secured to the locking member and actuation thereof in one direction rotates the locking member from locked position to a first released position in which the first arm portion is moved out of engagement with the one rail to allow longitudinal movement of the seat. Actuation of the handle in the other direction rotates the locking member from locked position to a second released position in which the second arm portion is moved out of engagement with the seat to allow rotational movement of the seat.

4 Claims, 6 Drawing Figures

Patented May 2, 1972

INVENTOR.
DuWayne D. Dresden
BY
Herbert Furman
ATTORNEY

Patented May 2, 1972

INVENTOR.
DuWayne D. Dresden
BY
Herbert Furman
ATTORNEY

SWIVEL SEAT LOCKING MECHANISM

This invention relates to a locking mechanism for controlling rotational and longitudinal movement of a vehicle seat with respect to a vehicle.

It is well known to mount a vehicle seat on a vehicle floor for both rotational and longitudinal movement with respect thereto. Generally, the longitudinal movement positions the seat at a longitudinal position which locates the vehicle occupant at the desired position with respect to the vehicle controls. The rotational movement allows the seat to be rotated from a forwardly facing position to a laterally facing position in which the occupant is allowed convenient entrance to or egression from the vehicle. Likewise, the seat may be rotated from the laterally facing position to a rearwardly facing position to allow access to the rear vehicle seat in a vehicle having a limited door opening.

This invention provides a locking mechanism which selectively and alternately allows either longitudinal movement of the seat or rotational movement thereof.

An object of this invention is to provide a locking mechanism for a vehicle seat which is selectively and alternately moved from a locked position to either a first released position allowing longitudinal movement of the seat or a second released position allowing rotational movement of the seat.

In carrying out this object, the locking mechanism includes a carrier that is slidably mounted on the vehicle for longitudinal movement with the seat. A locking member is mounted on the carrier for selective and alternate movement from a locked position to either first or second released positions. In locked position, the locking member engages the vehicle and the seat to hold the seat against longitudinal and rotational movement with respect to the vehicle. During the selective and alternate movement of the locking member to the first or second released position, the locking member selectively and alternately moves out of engagement with the vehicle or the seat to selectively and alternately allow longitudinal or rotational movement of the seat with respect to the vehicle.

In the preferred embodiment, the carrier is slidably mounted on the vehicle by a pair of longitudinally extending rails and the locking member, which is pivoted to the carrier, includes first and second arcuate arm portions that are biased to locked position into respective engagement with one of the rails and the seat.

Figure 1:
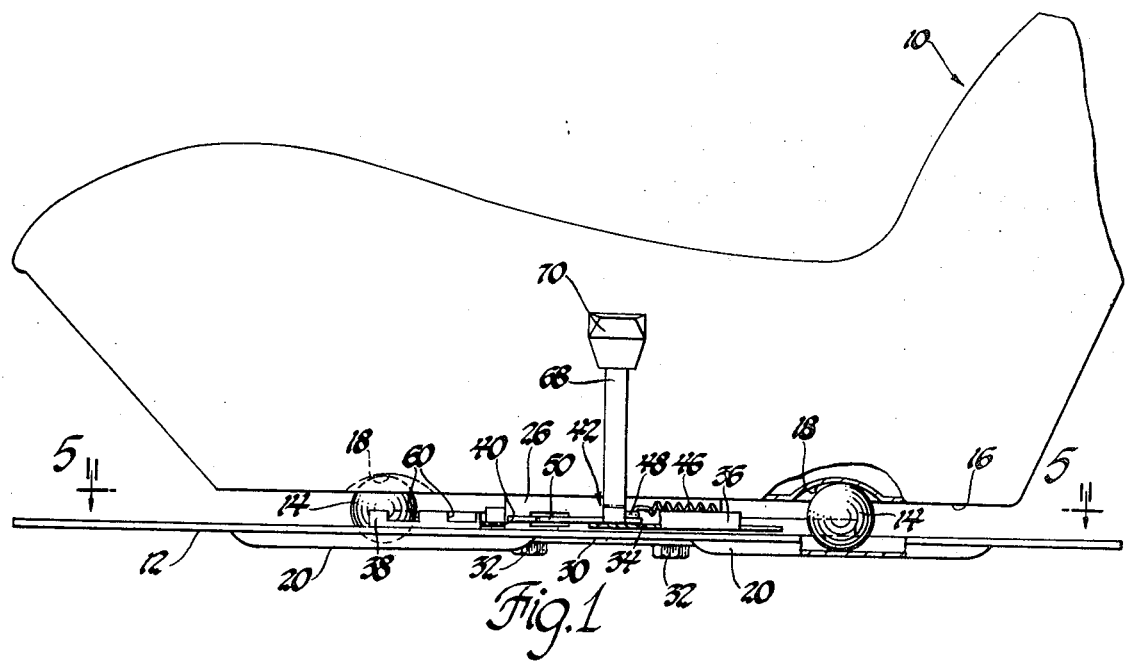
FIG. 1 is a partially broken away side elevation view of a vehicle seat mounted on a vehicle floor and including a locking mechanism according to the invention.
Figure 6:
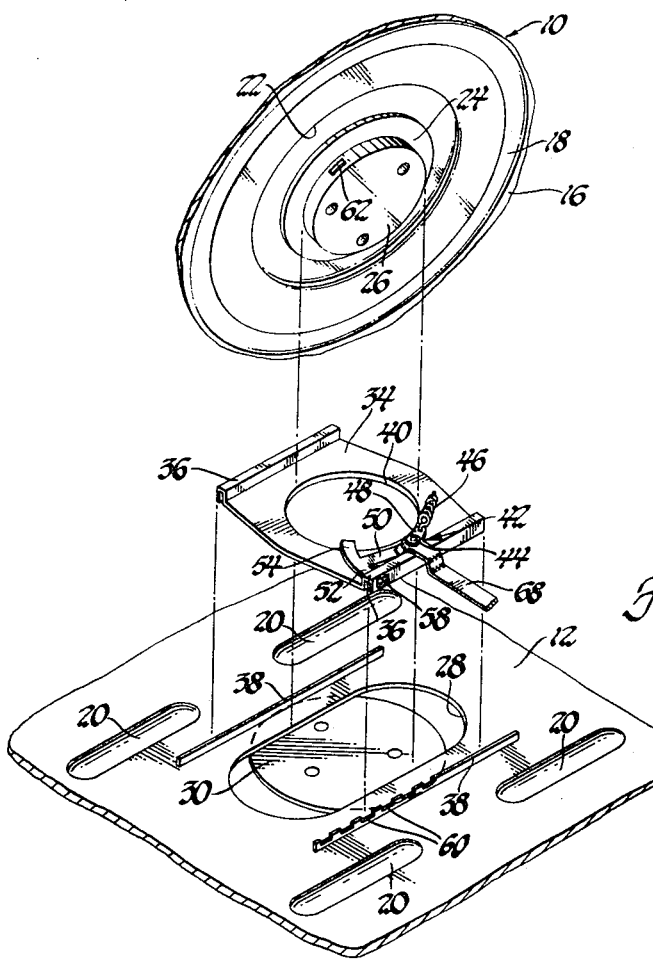
FIG. 6 is a disassembled perspective view.

Referring to FIG. 1, a vehicle seat generally indicated at 10 is supported on a vehicle floor pan 12 by ball bearings 14 as will be described. As seen in FIG. 6, the lower pan 16 of seat 10 includes a horizontally extending downwardly opening annular race 18 which receives ball bearings 14 and allows rotational movement of the seat 10 with respect to floor pan 12. The ball bearings 14 are also received within respective longitudinally extending grooves 20 in floor pan 12 to allow longitudinal movement of seat 10 on floor pan 12.

Figure 2:
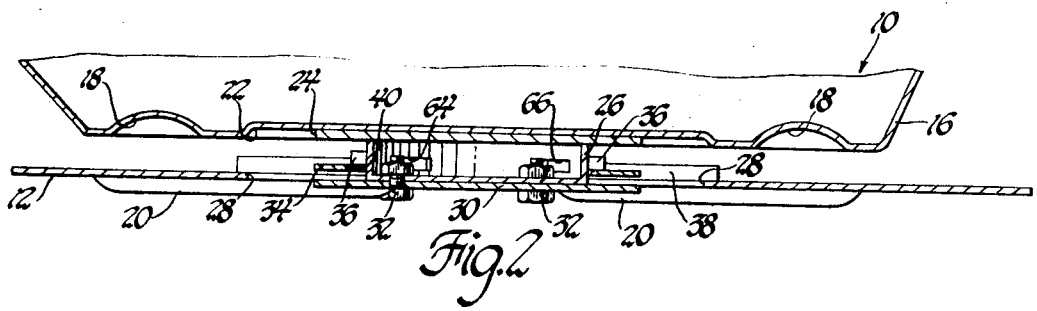
FIG. 2 is a sectional view of the seat taken generally along line 2—2 of FIG. 5.

As seen in FIG. 2, the lower pan 16 also includes a stamped depression 22 that receives an annular plate 24 which is welded to the lower pan 16. An annular cylinder 26 extends downwardly from plate 24 through a longitudinally extending aperture 28 in floor pan 12, best seen in FIGS. 5 and 6. An annular plate 30 is secured to the lower end of annular cylinder 26 by bolts 32 and engages the bottom of floor pan 12 adjacent the lateral edge portions of aperture 28 to prevent upward movement of seat 10 and to maintain the ball bearings 14 in the grooves 20 and annular race 18.

Figure 3:
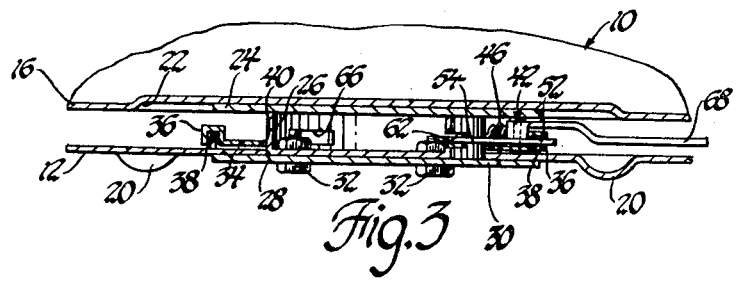
FIG. 3 is a sectional view taken generally along line 3—3 of FIG. 5.

As best seen in FIGS. 3 and 6, a carrier 34 includes downwardly opening U-shaped lateral edge flanges 36 which receive respective floor pan mounted longitudinally extending rails 38. The carrier 34 includes a central aperture 40 which receives the annular cylinder 26 to thus move carrier 34 longitudinally of floor pan 12 during longitudinal movement of seat 10. The rails 38 prevent the carrier 34 from rotating with respect to floor pan 12 during rotational movement of seat 10.

Figure 4:
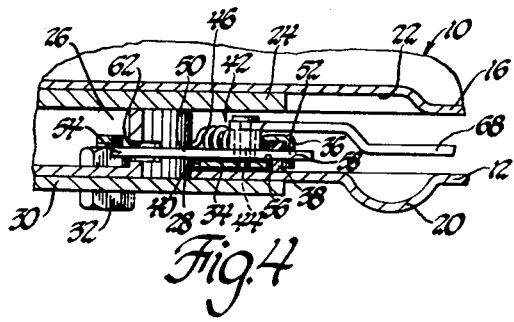
FIG. 4 is an enlarged view of a portion of FIG. 3.

A locking mechanism, generally indicated at 42, is pivoted to carrier 34 by a pin 44. A helical spring 46 has one end secured to carrier 34 and the other end secured to an arm 48 of locking mechanism 42 such that spring tension normally biases locking mechanism 42 to the locked position shown in FIG. 5. A locking member 50 includes first and second arcuate arm portions 52 and 54 that are concentric with pin 44. In locked position, the first arm portion 52 is received within apertures 56 and 58 of one of the edge flanges 36, as best seen in FIG. 4, and is also received within one of a plurality of longitudinally spaced slots 60 in the rail 38 respective to the edge flange 36 shown in FIG. 4. The arm portion 52, with locking mechanism 42 in locked position, thus restrains the seat 10 from longitudinal movement with respect to floor pan 12. With locking mechanism 42 in locked position, the second arm portion 54 is received within one of a plurality of apertures 62, 64, and 66 in annular cylinder 26. With arm portion 54 received within aperture 62, the seat 10 faces forwardly, as in FIG. 1, and is restrained from rotational movement therefrom by arm portion 54. Likewise, when arm portion 54 is received within aperture 64 or 66, seat 10 faces laterally of the vehicle or rearwardly and is restrained from rotational movement therefrom by arm portion 54.

As best seen in FIG. 3, an actuating handle 68 of locking mechanism 42 extends laterally from pin 44 to the side of seat 10 and upwardly therefrom with a knob 70 secured to the upper end thereof as seen in FIG. 1. Movement of actuating handle 68 forwardly causes the locking mechanism 42 to move clockwise, as in FIG. 5, against the bias of spring 46 to a first released position. During movement to the first released position, arm portion 52 moves out of the respective slot 60 in rail 38 while arm portion 54 moves farther into the selective aperture 62, 64, or 66 in annular cylinder 26. The seat 10 is then free for movement longitudinally of floor pan 12 while remaining restrained from rotational movement with respect thereto.

Figure 5:
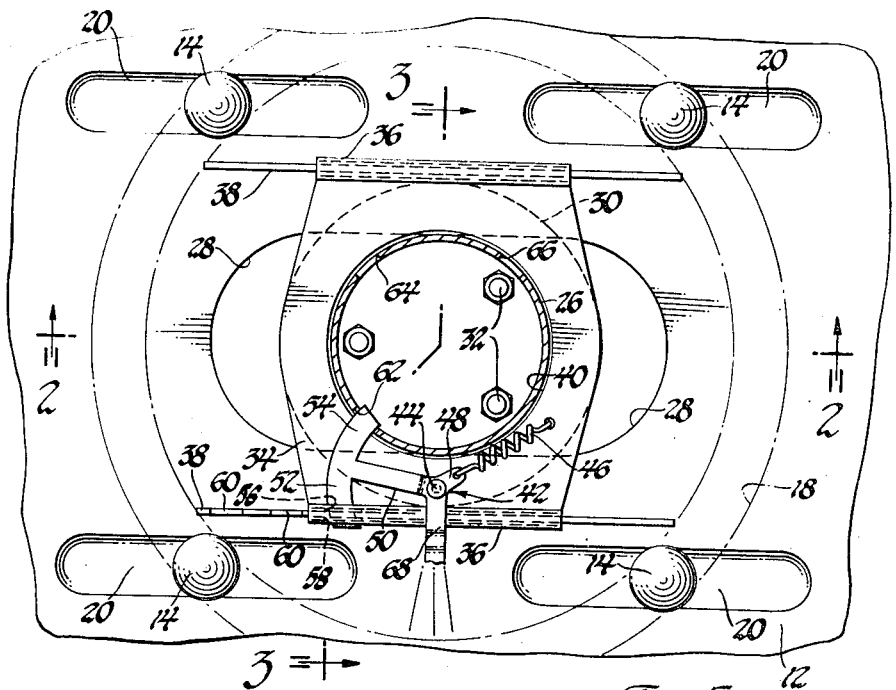
FIG. 5 is a top plan view taken generally along line 5—5 of FIG. 1 with the locking mechanism in locked position.

To allow rotational movement of seat 10, the actuating handle 68 is moved rearwardly to move the locking mechanism 42 counterclockwise, as in FIG. 5, to a second released position. During movement to the second released position, arm portion 54 of locking member 50 moves out of the selective aperture 62, 64, or 66 while arm portion 52 moves farther within the selective slot 60 in rail 38. The seat 10 is then free for rotational movement with respect to floor pan 12 while remaining restrained from longitudinal movement with respect thereto.

The locking mechanism 42 thus allows seat 10 to be moved longitudinally of the vehicle without any rotational movement. Likewise, the locking mechanism 42 allows seat 10 to rotate without any longitudinal movement thereof.

The locking mechanism thus selectively and alternately allows either longitudinal or rotational movement of the seat.

What is claimed is:

1. In a vehicle, the combination comprising, a seat, mounting means supporting the seat on the vehicle for rotational and longitudinal movement with respect thereto, carrier means mounted on the vehicle for longitudinal movement with the seat and restrained from rotational movement with respect to the vehicle, and locking means mounted on the carrier means for selective and alternate movement from a locked position to either first or second released positions, the locking means including first and second locking portions respectively engaging the seat and the vehicle to hold the seat against rotational and longitudinal movement with the locking means in locked position, the first locking portion of the locking means moving out of engagement with the vehicle as the locking means moves to the first released position to allow longitudinal movement of the seat and the carrier means with respect to the vehicle while the second locking portion remains in engagement with the seat to prevent rotational movement thereof at all times when the locking means is in this released position, the second locking portion of the locking means moving out of engagement with the seat as the locking means moves to the second released position to allow rotational movement of the seat with respect to the vehicle and the carrier means while the first locking portion remains in engagement with the vehicle to prevent longitudinal movement of the carrier means and the seat at all times when the locking mean is in this released position.

2. In a vehicle, the combination comprising, a seat, mounting means supporting the seat on the vehicle for rotational and longitudinal movement with respect thereto, a carrier mounted on the vehicle for longitudinal movement with the seat and restrained from rotational movement with respect to the vehicle, and a locking member mounted on the carrier for selective and alternate movement in opposite directions from a locked position to either first or second released positions, the locking member engaging the seat and the vehicle to hold the seat against rotational and longitudinal movement with the locking member in locked position, the locking member moving out of engagement with the vehicle during movement to the first released position to allow longitudinal movement of the seat and the carrier with respect to the vehicle, the locking member moving out of engagement with the seat during movement to the second released position to allow rotational movement of the seat with respect to the vehicle and the carrier.

3. In a vehicle, the combination comprising, a seat, mounting means supporting the seat on the vehicle for rotational and longitudinal movement with respect thereto, a pair of longitudinally extending rails mounted on the vehicle, a carrier mounted on the rails for longitudinal movement with the seat, the rails holding the carrier against rotational movement with respect to the vehicle, and a locking member mounted on the carrier for selective and alternate movement in opposite directions from a locked position to either first or second released positions, the locking member engaging one of the rails and the seat in locked position to hold the seat against longitudinal and rotational movement, the locking member moving out of engagement with the one rail during movement to the first released position to allow longitudinal movement of the seat and the carrier with respect to the vehicle, the locking member moving out of engagement with the seat during movement to the second released position to allow rotational movement of the seat with respect to the vehicle and the carrier.

4. The combination as in claim 3 wherein the locking member is pivoted to the carrier and includes first and second arcuate arm portions respectively engaging the one rail and the seat in locked position.

\* \* \* \* \*